United States Patent
Radu et al.

(10) Patent No.: US 11,971,548 B1
(45) Date of Patent: Apr. 30, 2024

(54) MARKERS FOR OBJECTS SEEN THROUGH A WINDSCREEN

(71) Applicant: Microchip Technology Incorporated, Chandler, AZ (US)

(72) Inventors: Cristina-Georgeta Radu, Bucharest (RO); Valentin Stoia, Bucharest (RO)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/227,503

(22) Filed: Jul. 28, 2023

Related U.S. Application Data (60) Provisional application No. 63/454,134, filed on Mar. 23, 2023.

(51) Int. Cl.
| | |
|---|---|
| *G02B 27/01* | (2006.01) |
| *B60K 35/23* | (2024.01) |
| *B60K 35/28* | (2024.01) |
| *B60K 35/50* | (2024.01) |

(52) U.S. Cl.
CPC ............ *G02B 27/017* (2013.01); *B60K 35/50* (2024.01); *B60K 35/23* (2024.01); *B60K 35/28* (2024.01); *B60K 2360/178* (2024.01); *B60K 2360/334* (2024.01); *G02B 2027/0138* (2013.01); *G02B 2027/014* (2013.01)

(58) Field of Classification Search
None
See application file for complete search history.

(56) References Cited

U.S. PATENT DOCUMENTS

| | | | |
|---|---|---|---|
| 2019/0180485 A1* | 6/2019 | Kim .................... | B60K 35/00 |
| 2020/0239018 A1* | 7/2020 | Tudosie ............... | B60W 50/14 |
| 2021/0225055 A1 | 7/2021 | Choi et al. | |

OTHER PUBLICATIONS

Krüger, Michelle et al., "Virtual Windshields: Merging Reality and Digital Content to Improve the Driving Experience," URL: https://arxiv.org/abs/1405.0190, 111 pages, May 5, 2014.
Lindemann, Patrick et al., "Supporting Driver Situation Awareness for Autonomous Urban Driving with an Augmented-Reality Windshield Display," 2018 IEEE International Symposium on Mixed and Augmented Reality Adjunct (ISMAR—Adjunct), pp. 358-363, Oct. 16, 2018.
International Search Report and Written Opinion, Application No. PCT/US2023/033102, 16 pages, Dec. 11, 2023.

(Continued)

*Primary Examiner* — Stephen T. Reed
(74) *Attorney, Agent, or Firm* — SLAYDEN GRUBERT BEARD PLLC (57) ABSTRACT

A system having a camera to capture a scene image of a scene having an object as viewed from a perspective of an operator through a windscreen; a computer vision circuit to identify an object image corresponding to the object in the scene image captured by the camera; a marker generator circuit to generate a marker indicative of the identified object image and to determine a marker position in the operator's line of sight between the object and the operator; and a screen to display the generated marker in the marker position to appear associated with the identified object as viewed from the perspective of the operator through the windscreen. Also, methods for marking objects.

20 Claims, 7 Drawing Sheets

(56) References Cited

OTHER PUBLICATIONS

Everingham, Mark et al., "The PASCAL Visual Object Classes (VOC) Challenge," International Journal of Computer Vision, vol. 88, URL: https://www.microsoft.com/en-us/research/wp-content/uploads/2016/02/PascalVOC_IJCV2009.pdf, 36 pages, Sep. 9, 2009.

Microchip Technology Incorporated, "Sam D Family of Microcontrollers," URL: https://www.microchip.com/en-us/products/microcontrollers-and-microprocessors/32-bit-mcus/sam-32-bit-mcus/sam-d, 6 pages, Retrieved online Aug. 10, 2023.

Microchip Technology Incorporated, "VectorBlox™ Accelerator Software Development Kit for PolarFire® FPGAs," URL: https://www.microchip.com/en-us/products/fpgas-and-plds/fpga-and-soc-design-tools/vectorblox#, 5 pages, Retrieved Online Aug. 10, 2023.

* cited by examiner

MARKERS FOR OBJECTS SEEN THROUGH A WINDSCREEN

RELATED PATENT APPLICATION

This application claims priority to commonly owned U.S. Application No. 63/454,134, filed 23 Mar. 2023, the entire contents of which are hereby incorporated by reference for all purposes.

TECHNICAL FIELD

The present disclosure relates to warning systems, in particular warning systems that provide visual markers to machine operators of objects in a machine operator's field of view.

BACKGROUND

Machine accidents can happen due to poor visibility in some meteorological conditions. Machine operators, including vehicle drivers, can easily ignore some objects in the operator's field of vision that have the same color as the surrounding landscape. In poor meteorological conditions, some objects may not be seen well, particularly if the objects are the same color as the surrounding landscape.

Advanced Driver Assistance Systems (ADAS) are electronic systems to assist vehicle operators to increase safety using a Human-Machine Interface (HMI) to alert the driver to potential problems. The term human-machine-interface (HMI) refers to the manner a human machine operator, such as a vehicle driver, interacts with a machine, such as a vehicle. ADAS technologies with human-machine interfaces (HMI) include, for example: navigation systems with global positioning system (GPS) and traffic message channel (TMC) for up-to-date traffic information, blind spot monitoring (BSM), driver drowsiness detection or driver monitoring systems (DMS), heads-up display (HUD), intelligent speed advice (ISA), intelligent speed adaptation (ISA), intersection movement assist (IMA), lane keeping assist (LKA), left turn assist (LTA), night vision system (NVS), surround view cameras (SVC), traffic jam assist, turning assistant, vehicle communication systems, traffic signal and sign recognition or road sign recognition (RSR), pedestrian detection system (PDS) or (PED), forward collision warning (FCW), blind spot warning (BSW), do-not-pass warning (DNPW), lane departure warning (LDW) or lane change warning (LCW), lane change assistance, and wrong-way driving warning.

Conventional human-machine-interfaces do not advise machine operators of some objects in the operator's field of vision without drawing the operator's attention away from the operation of the machine, in particular, drawing the operator's eyes away from the field of view of the surroundings.

There is a need for systems and methods having a human-machine interface that advises operators of objects in a field of view without drawing the operator's attention away from the field of view.

SUMMARY OF THE INVENTION

Aspects provide systems and methods having a human-machine interface that advises operators of objects in a field of view without drawing the operator's attention away from the field of view.

According to an aspect, there is provided a system having a camera to capture a scene image of a scene having an object as viewed from a perspective of an operator through a windscreen, a computer vision circuit to identify an object image corresponding to the object in the scene image captured by the camera, a marker generator circuit to generate a marker indicative of the identified object image and to determine a marker position in the operator's line of sight between the object and the operator, and a screen to display the generated marker in the marker position to appear associated with the identified object as viewed from the perspective of the operator through the windscreen.

A method comprising: capturing a scene image of a scene having an object as viewed from a perspective of an operator through a windscreen; identifying an object image corresponding to the object in the scene image; generating a marker indicative of the identified object image and determining a marker position in the vehicle operator's line of sight between the object and the operator; and displaying the generated marker in the marker position to appear associated with the identified object as viewed from the perspective of the operator through the windscreen.

A system comprising: a camera to capture a scene image of a scene having an object as viewed from a perspective of a vehicle operator through a vehicle windscreen; a computer vision circuit to identify an object image corresponding to the object in a scene image captured by the camera; a marker generator circuit to generate a marker indicative of the identified object image and to determine a marker position in the vehicle operator's line of sight between the object and the vehicle operator; an organic light-emitting diode (OLED) screen to display the generated marker in the marker position to appear associated with the identified object as viewed from the perspective of the vehicle operator through the vehicle windscreen; and a communication network facilitating communications between at least two of the camera, the computer vision circuit, the marker generator circuit, and the OLED screen.

BRIEF DESCRIPTION OF THE DRAWINGS

The figures illustrate systems and methods having a human-machine interface that advises operators of objects in a field of view without drawing the operator's attention away from the field of view.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

A human-machine interface (HMI) advises operators of objects in a field of view without drawing the operator's attention away from the field of view. A camera captures a scene image of a scene having an object as viewed from a perspective of an operator through a windscreen, a computer vision circuit identifies an object image corresponding to the object in the scene image captured by the camera, a marker generator circuit generates a marker indicative of the identified object image and determines a marker position in the operator's line of sight between the object and the operator, and a screen displays the generated marker in the marker position to appear associated with the identified object as viewed from the perspective of the operator through the windscreen.

Systems and methods may provide more visibility for a vehicle driver, early detection of moving objects, or detection of objects blocking the way.

An HMI assists vehicle operators driving through poor meteorological conditions by detecting fast moving objects which may collide with the vehicle, and detecting objects difficult to see standing in front of the vehicle. This system may outline the fast moving objects or objects standing in the way of the vehicle to warn the vehicle operator of a potential impact. Systems may assist vehicle operators to possibly avoid some types of vehicle accidents.

Aspects provide a system comprised of a device which sends a scene image having an object image replicating the scene having the object as viewed from the perspective of the operator through the windscreen to a marker generator circuit/computer vision circuit which does a determination based on the scene image (using machine learning (ML) which may also remove added outlines from the scene image so the marker generator circuit/computer vision circuit does not process the same things twice) then displays outlines on a transparent screen on the windscreen. Alternatively, the system may have a pair of glasses, which captures scene images, calculates the outlines, and displays them on the lens. Alternatively, the system may have a marker generator circuit/computer vision circuit with a Time-of-Flight camera that takes images of the driver and a camera that captures scene images through the windscreen and a marker generator circuit that calculates the operator's eye position and the position of the object images then displays markers on the windscreen using a projector.

Figure 1A:
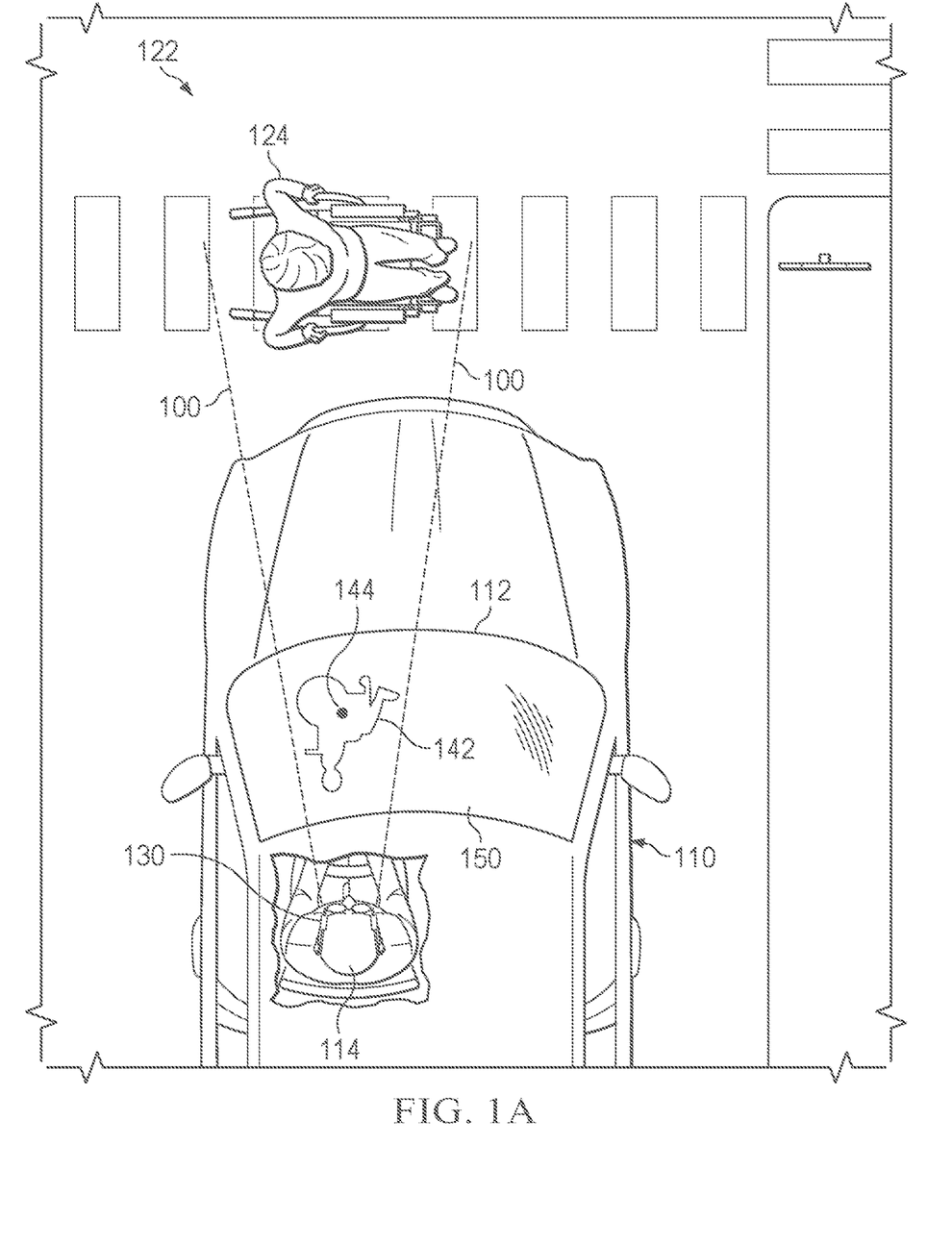
FIGS. 1A and 1B show top and side views, respectively, of a system for capturing an object image and displaying a marker in a line of sight between a machine operator and an object.
Figure 1B:
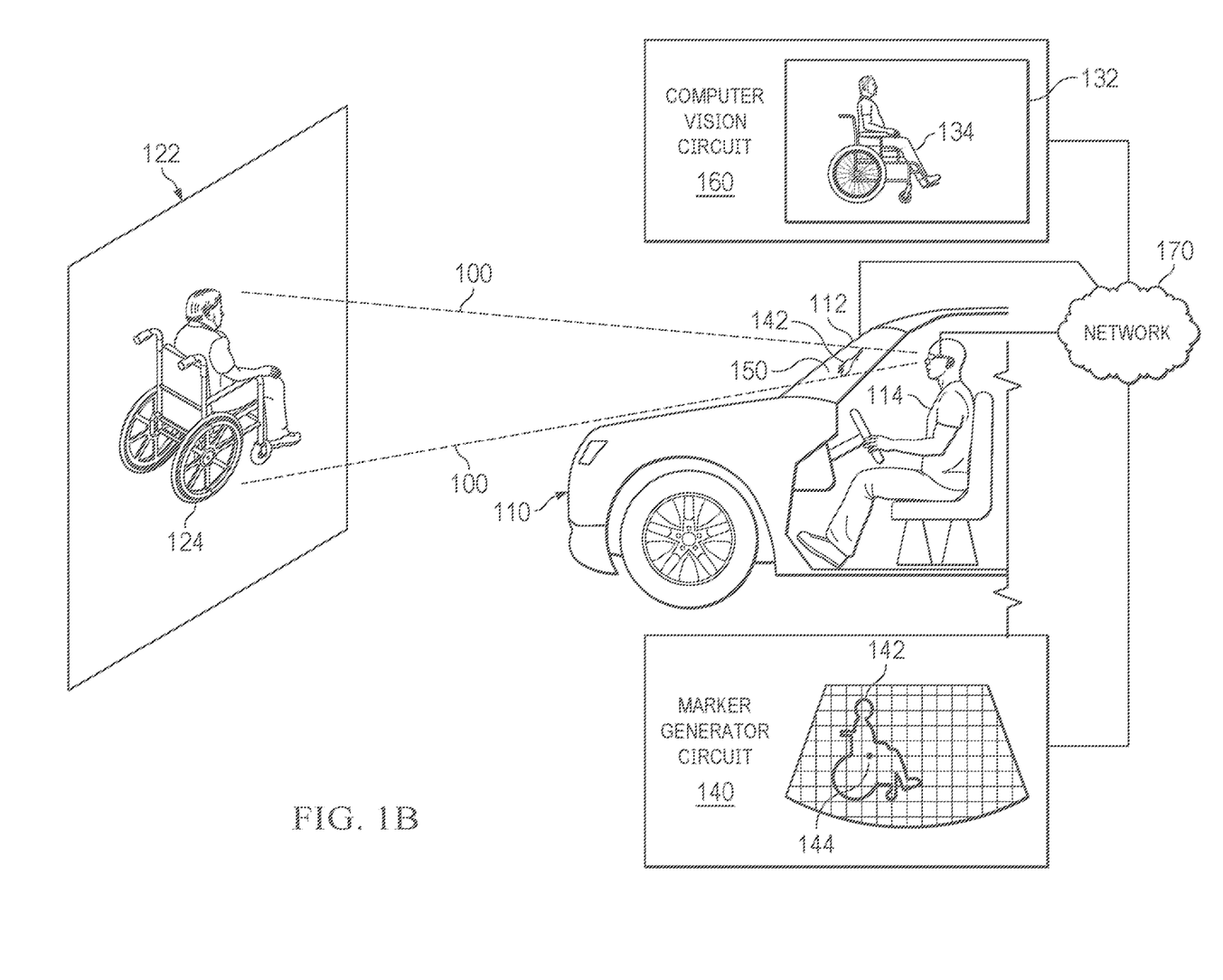

FIGS. 1A and 1B show top and side views, respectively, of lines of sight between an object and a vehicle operator as seen through the vehicle windscreen from the vehicle operator's perspective. An operator 114 is seated in a driver's seat of the machine 110, in this case a vehicle, so as to view a scene 122 including an object 124 through a windscreen 112 of the machine 110. Lines of sight 100 extend from the operator 114 to the object 124 through the windscreen 112. A camera 130 captures a scene image 132 having an object image 134, the scene image 132 replicating the scene 122 having the object 124 as viewed from the perspective of the operator 114 through the windscreen 112. A computer vision circuit 160 identifies the object image 134 corresponding to the object 124 in the scene image 132 captured by the camera 130. A marker generator circuit 140 generates a marker 142 indicative of the identified object image 134 and determines a marker position 144 that places the marker 142 on a screen 150 in the operator's line of sight 100 between the object 124 and the operator 114. The screen 150 displays the generated marker 142 in the marker position 144 to appear associated with the identified object 124 as viewed from the perspective of the operator 114 through the windscreen 112. The generated marker 142 may be significantly larger in appearance than the marker position 144, and thus a general center of the generated marker 142 may be generally aligned with generated marker position 144 as viewed from the perspective of the operator 114 through the windscreen 112.

The screen 150 may be an organic light-emitting diode (OLED) screen fitted over the windscreen 112, or attached to an inner face of windscreen 112. Rather than an OLED screen overlaid on the windscreen 112, the screen 150 may have an associated projector to project the marker 142 onto the screen 150, wherein the screen 150 reflects visible light from the projector 152. See FIG. 2. Alternatively, the screen 150 and the windscreen 112 may be a single unitary structure, rather than two independent structures layered together. A windscreen 112 may be shatter-proof automobile glass. The screen 150 may be a see-through screen that produces images from within (e.g., OLED), or reflect images projected onto it (e.g., projector).

The camera 130 may be worn by the operator 114. The camera 130 may alternatively be mounted proximate the operator's 114 line of sight 100, in particular, the camera 130 may be mounted to the driver's seat or vehicle compartment proximate the operator's head. The marker 142 may be an outline of the object 124. The marker generator circuit 140 may determine the marker position 144 that causes the marker 142 displayed on the screen 150 to appear overlaid on the identified object 124 from the perspective of the operator 114 through the windscreen 112 because the marker 142 is in the line of sight between the object 124 and the operator 114.

A communication network 170 may communicate information between the camera 130, the computer vision circuit 160, the marker generator circuit 140, and the screen 150. The communication network 170 may be a wired network, a wireless network, or a combination thereof.

Figure 2:
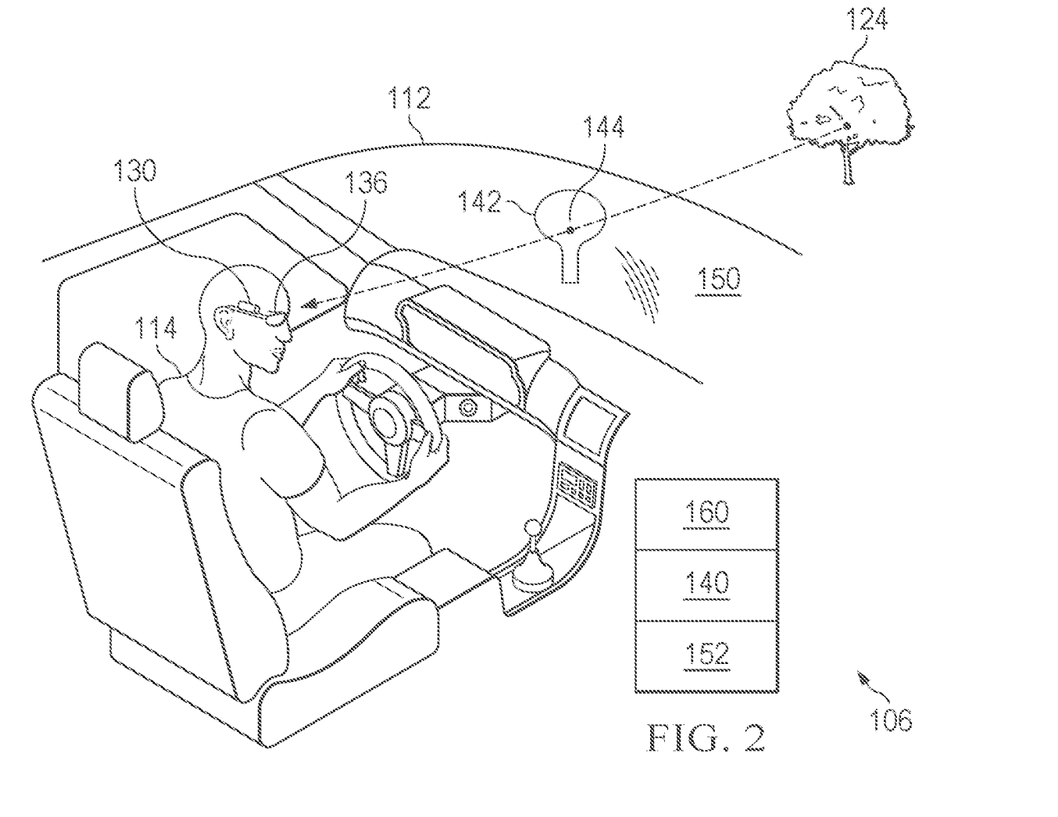
FIG. 2 shows a perspective view of a system for capturing a scene image having an object image replicating the scene having the object as viewed from the perspective of the operator through the windscreen to a marker generator circuit, which determines a position for displaying an object marker in a line of sight on a transparent screen on the windscreen.

FIG. 2 shows a system 106 comprised of a camera 130, which captures and sends a scene image 132 (see FIG. 1B) having an object image 134 replicating the scene 122 having the object 124 as viewed from the perspective of the operator 114 through the windscreen 112 to a computer vision circuit 160. A marker generator circuit 140 determines a marker position 144 based on the scene images 132 received from the camera 130 and then displays a marker 142 on the screen 150 on the windscreen 112 of the vehicle. The camera 130 may take pictures continuously at a rate of at least sixty pictures per second. The camera 130, computer vision circuit 160, marker generator circuit 140, and screen 150 may communicate through the communication network 170, as described above. Communication may be encrypted, so hackers may not gain access to data generated by the system 106 or display unwanted data on the screen 150. The marker 142 may be an outline of the object 124 displayed on an OLED screen 150 fitted to the windscreen 112. As indicated above, a transparent screen 150 made with OLEDs may be fitted on an inside face, or an outside face, of the vehicle windscreen 112. Alternatively, the marker 142 may be displayed on a screen 150/windscreen 112 with light provided by a projector 152.

As shown in FIG. 2, the system 106 sends scene images 132 as viewed through the windscreen 112 from operator's 114 point of view to the marker generator circuit 140, which determines the marker position 144 based on the pictures. The marker generator circuit 140 displays markers 142 (outlines) on a transparent screen 150 on the windscreen 112. The system 106 has a pair of glasses 136 with the camera 130 mounted thereto that may be worn by the vehicle operator 114. Alternatively, a pair of glasses 136 may have a camera 130 mounted on an earpiece of the glasses 136 and the lenses of the glasses 136 have screens 150 to display markers 142. See FIG. 3. The glasses 136 may also have a transmitter/receiver 172 to transmit scene images to a communication network 170. The transmitter/receiver 172 may use RF communication (WiFi, Bluetooth, and others without limitation) to transmit images captured by the camera 130 fitted on the glasses 136. The glasses 136 may also have a microcontroller having a microprocessor such as a SAMA5/7, available from Microchip Technology Incorporated, Chandler, Arizona, with Yocto Linux to process scene images 132 from the camera 130. Data may be transmitted/received between components of the glasses 136 via hard-wired connections or via Wi-Fi, Bluetooth BLE, or another RF communication protocol without limitation. Where the glasses 136 both capture images and display markers, a microcontroller on the glasses 136 may perform image processing and marker generation functions without a transmitter/receiver sending and receiving data to another processor, so that the glasses are self-contained. The camera 130 captures scene images 132 of the landscape seen through the vehicle windscreen 112 from the vehicle operator's 114 perspective. The vehicle windscreen 112 may include an OLED screen 150 to display markers 142 of objects 124 in the landscape to bring the objects to the attention of the vehicle operator 114. Alternatively, a projector 152 may shine light on the screen 150 so display markers 142 are reflected by the screen 150. A computer vision circuit 160 identifies objects 124 in the landscape and the marker generator circuit 140 generates one or more markers 142, such as outlines of the objects, and determines marker positions 144 for displaying the markers 142 on the OLED screen 150 so that the markers 142 appear to overlay the respective objects 124 from the vehicle operator's perspective. The computer vision circuit 160 may use a microprocessor unit (MPU) with Yocto/Buildroot with Python-based machine learning (ML) for image processing (e.g., Open Source Computer Vision Library). The marker generator circuit 140 may use a convolutional neural network (CNN)-based artificial intelligence/machine learning (AI/ML) inference, such as VectorBlox Accelerator Software Development Kit for PolarFire FPGAs by Microchip Technology Corporation, of Chandler, Arizona. The OLED screen 150 or projector 152 and camera 130 on glasses 136 may take turns in working to circumvent a situation where machine learning (ML) needs to remove the markers 142 caught by the camera 130. Because markers 142 are displayed on the screen 150, a camera 130 capturing a scene image 132 through the windscreen 112 may also capture markers 142. To prevent the capture of unwanted markers 142 in scene images 132, the markers 142 may be displayed at different times than when the camera 130 captures the scene images 132. Rather than an OLED screen 150, the system may be fitted with the projector 152 to display images on the vehicle windscreen 112.

Figure 3:
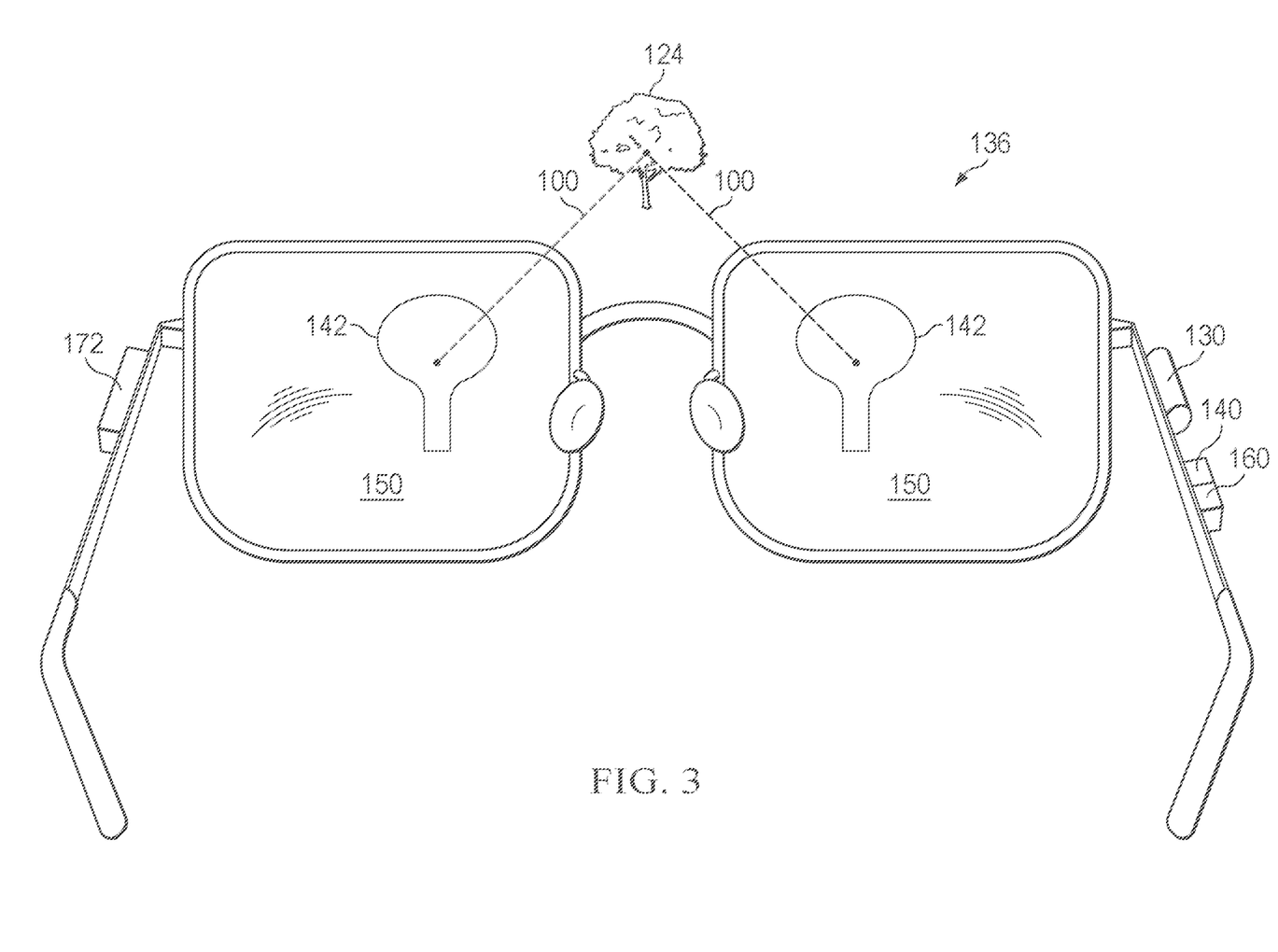
FIG. 3 shows a perspective view of a pair of glasses to be worn by a machine operator, the pair of glasses having a camera and a transmitter/receiver.

FIG. 3 shows a pair of glasses 136 with a camera 130 mounted on an earpiece of the glasses 136 and the lenses of the glasses have screens 150 to display markers 142. The glasses 136 may also have a transmitter/receiver 172 to transmit scene images to a communication network (e.g., communication network 170 described above) and receive the marker 142 and marker position 144 (see FIGS. 1A-1B) from the marker generator circuit 140 via the communication network 170. A computer vision circuit (e.g., computer vision circuit 160) coupled to the communication network 170 may identify objects in the scene images, and the marker generator circuit 140 may generate markers 142 and calculate marker position 144 for respective markers 142 for display of the markers 142 on the screens 150 of the glasses 136.

A system may comprise: device for capturing a scene image, such as a camera 130, a marker position device, such as a marker generator circuit 140, and an OLED screen 150. The camera 130 may capture scene images continuously, and send them to the marker generator circuit 140 and the marker generator circuit 140 may send markers to the screen 150 through Wi-Fi or Bluetooth BLE. Scene images may be captured with one of the following devices: a pair of glasses 136 with a camera 130 and Wi-Fi or Bluetooth BLE transmitter/receiver, or a camera device placed in the vehicle above the operator 114 or in a headband worn by the operator 114. The marker generator circuit 140 may receive the captured scene images from camera 130 through Wi-Fi or Bluetooth BLE, calculate the speeds and angles of objects in the capture scene images, scale and rotate the screen images 132 according to the size and shape of the screen 150, recognize objects in the capture scene images by machine learning (ML), and use the distance of the screen 150 from the operator 114, to position the markers 142 to coincide with the objects 124 in the operators line of sight 100. Because the camera 130 may not be placed in the operator's line of sight 100 without impairing the operator's view, the position of markers 142 may be adjusted to be in the line of sight 100 based on the relative position of the camera 130 to operator's 114 eyes by translating the markers left, right, downwards, or upwards with a predetermined distance amount (for example a few centimeters) depending on where the camera 130 is positioned relative to the operator's eyes. The distance amount may also be scaled in accordance with the angle of the screen 150. The system may use machine learning (ML) to identify objects 124 so that marker position 144 may be determined. The computer vision circuit 160 may remove added outlines or markers 142 from the screen 150 before the camera 130 captures another scene image 132. The computer vision circuit 160 may ensure displayed markers 142 are not captured in the next scene image 132 taken by the camera 130, so as to preclude double markers 142 associated with the same object 124.

In an aspect, the system may have a Time-of-Flight camera to determine the distance between the Time-of-Flight camera and the object 124 and a camera which captures scene images 132 as seen from the perspective of operator 114. The system may calculate positions to display markers on the windscreen using a projector based on eye position of operator 114 and the position of the objects. The eye position of operator 144 may be determined by the operator 144 wearing a pair of glasses 136 with a camera 130 mounted thereon, so that the relative positions of the camera 130 and operator 144 eye positions are known, where the eye positions of operator 144 are assumed to be in line with the lenses of the glasses 136. Alternatively, the camera 130 may be worn in a headband on the head of operator 144, which provides known relative positions of camera 130 and operator 144 eyes. If the camera 130 is mounted in the vehicle near the head of operator 144, the seat position, mirror positions, steering wheel positions, and headrest positions may be taken into account to derive an assumed operator 144 eye position relative to the mounted camera 130.

The glasses 136 may have a camera 130 mounted on an earpiece of the glasses 136 and the lenses of the glasses 136 have screens 150 to display markers 142. See FIG. 3. The glasses 136 may have a computer vision circuit 160 and a marker generator circuit 140 on the glasses 136 to perform image processing and marker generation functions. The vehicle operator may put on the glasses 136 and see outlines of moving/standing objects in the path of the vehicle, wherein the outlines are displayed either on the OLED screen of the vehicle windscreen 112 or in the lenses of the glasses 136, so as to appear overlaid on the objects viewed through the screen (OLED or lenses). The glasses 136 may capture scene images 132 via a camera 130 as seen from the perspective of operator 144 and send the captured scene images 132 to the marker position device, such as a marker generator circuit 140. The marker generator circuit 140 receives the captured scene images 132 from the glasses or another similar device and displays outlines on the OLED screen 150 or lenses of the glasses 136. The marker generator circuit 140 may use machine learning (ML) to calculate where to position the outlines (markers) on the OLED screen 150 of the vehicle windscreen 112 or lenses of the glasses 136 so as to appear overlaid on the objects and updates the position of the outlines (markers) in real time so that outlines appear to remain overlaid on the objects notwithstanding objects 124 changing position in the scene image 132 and the vehicle being operated travels. The OLED screen 150 may be fitted to the vehicle windscreen 112. The outlines to be displayed may be received by the OLED screen 150 from the marker generator circuit 140. The outlines may be observed by the driver when displayed on the OLED screen.

Figure 4:
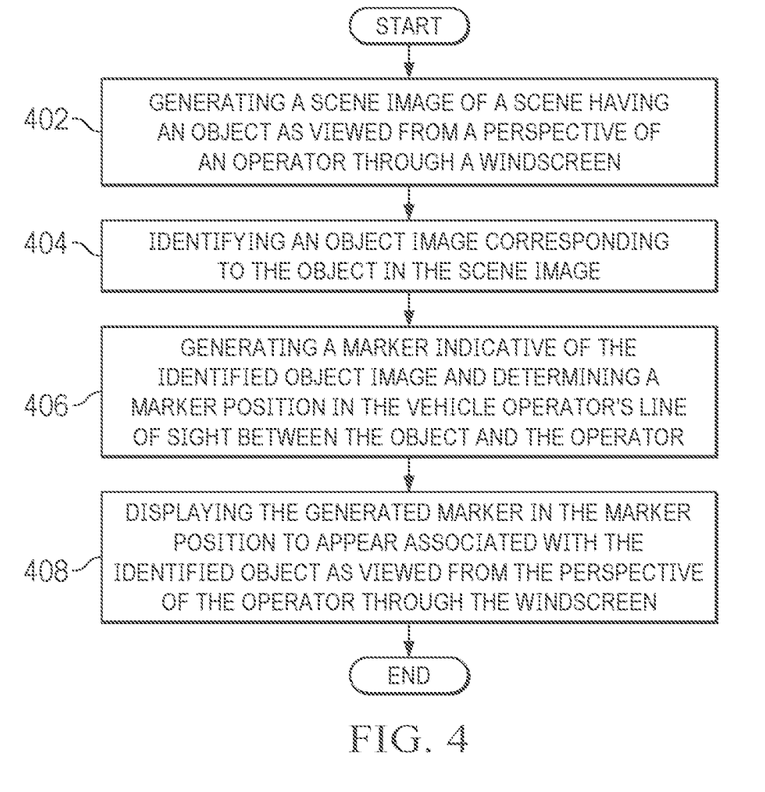
FIG. 4 a method of bringing objects to the attention of a vehicle operator.

As shown in FIG. 4, a flow chart of a method is shown for advising operators of objects in a field of view without drawing the operator's attention away from the field of view. A scene image is generated 402 of a scene having an object as viewed from a perspective of an operator through a windscreen. An object image is identified 404 corresponding to the object in the scene image. A marker is generated 406 indicative of the identified object image and a marker position is determined in the vehicle operator's line of sight between the object and the operator. The generated marker is displayed 408 in the marker position to appear associated with the identified object as viewed from the perspective of the operator through the windscreen.

An aspect provides a system which may allow moving objects to be outlined in the operator's line of sight comprised of a pair of glasses or a headband holding a camera that capture scene images of the scene through the windscreen. In an alternative example a camera may be placed in the vehicle near the operator's head to capture scene images through the windscreen. A marker generator circuit use data received from a camera and data based on the size of the windscreen, and data derived from previous scene images to calculate the position of moving objects, so that markers may be displayed on the screen overlaid on the objects. If the camera capturing the scene images is placed above the driver, the marker position device may use vehicle seat, mirror, and steering wheel position data to determine the position of the driver's head relative to the camera. The system may also have a Time-of-Flight camera, which may detect a distance between the Time-of-Flight camera and an object 124. The marker generator circuit may use distance information to position a marker or provide a marker identifying the identified object. The marker generator circuit is to position the marker so as to appear associated with the identified object from the perspective of the operator through the windscreen.

Figure 5:
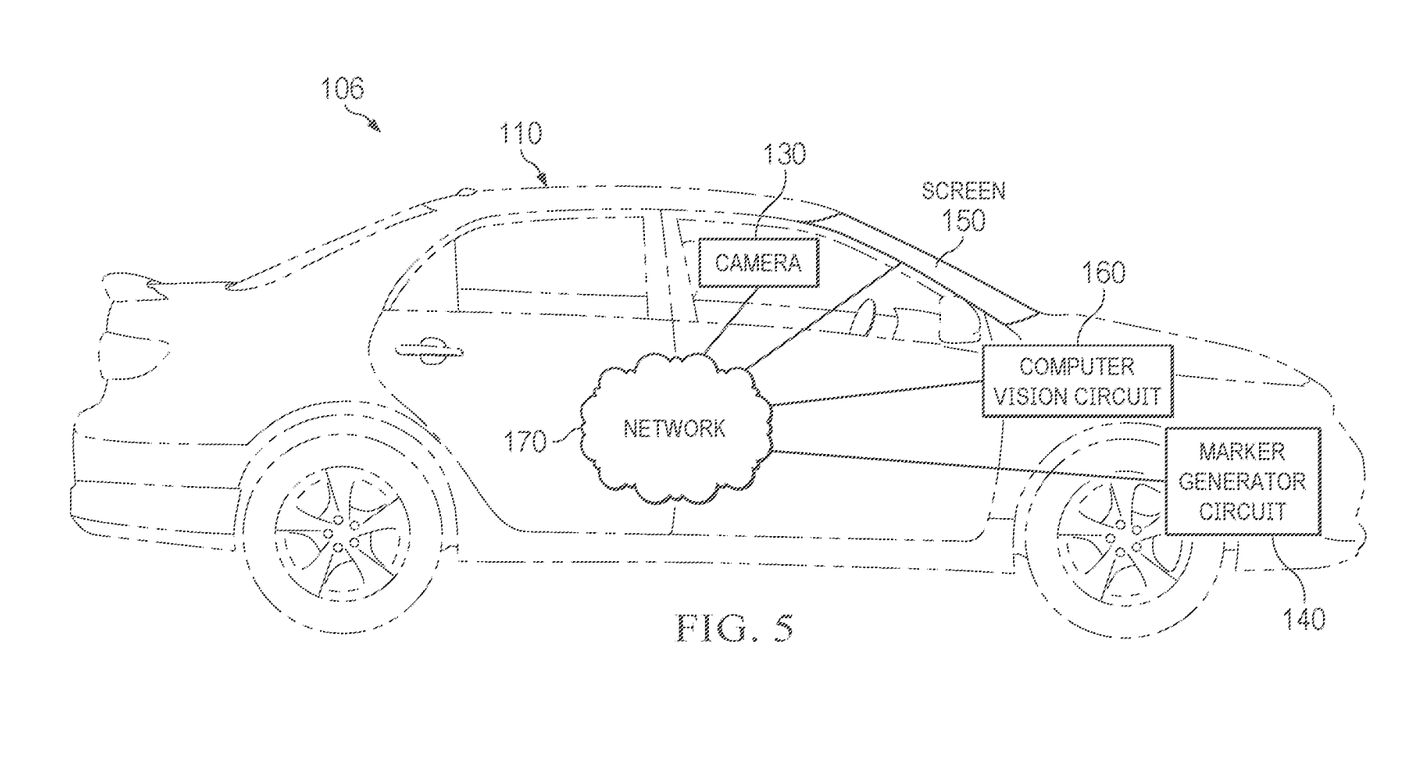
FIG. 5 shows a block diagram of nodes within a network, wherein nodes include a camera, a screen, a computer vision circuit, and a marker generator circuit.

FIG. 5 shows a machine 110 (e.g., a vehicle, a truck, a bus, a ship, and/or an aircraft) including a communication network 170 (e.g., a 10SPE network) having a number of nodes: camera 130, screen 150, marker generator circuit 140, and computer vision circuit 160. Each node may have a transmitter/receiver for communicating data via the communication network 170. Each node may be wireless or wired to the communication network 170. The communication network 170 may include a vehicle network.

Figure 6:
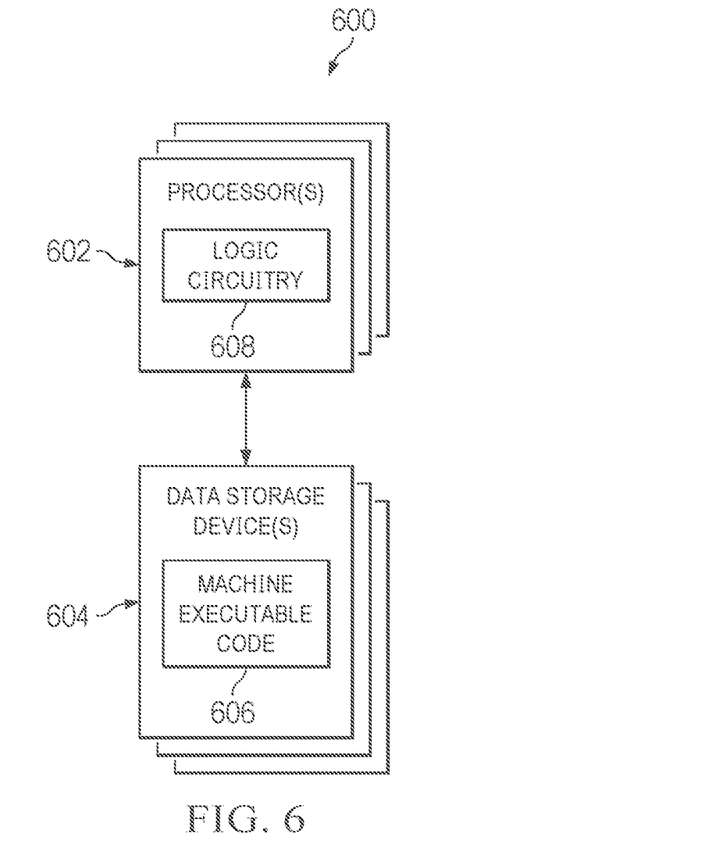
FIG. 6 illustrates functional elements, which may be implemented in any suitable hardware, software, firmware, or combinations thereof.

FIG. 6 shows a block diagram of circuitry 600 that may be used to implement various functions, operations, acts, processes, and/or methods. The circuitry 600 includes one or more processors 602 (sometimes referred to herein as "processors 602") operably coupled to one or more data storage devices (sometimes referred to herein as "storage 604"). The storage 604 includes machine executable code 606 stored thereon and the processors 602 include logic circuitry 608. The machine executable code 606 includes information describing functional elements that may be implemented by (e.g., performed by) the logic circuitry 608. The logic circuitry 608 is adapted to implement (e.g., perform) the functional elements described by the machine executable code 606. The circuitry 600, when executing the functional elements described by the machine executable code 606, should be considered as special purpose hardware configured for carrying out functional elements disclosed herein. In some embodiments the processors 602 may perform the functional elements described by the machine executable code 606 sequentially, concurrently (e.g., on one or more different hardware platforms), or in one or more parallel process streams.

When implemented by logic circuitry 608 of the processors 602, the machine executable code 606 adapts the processors 602 to perform operations of embodiments disclosed herein. For example, the machine executable code 606 may adapt the processors 602 to perform at least a portion or a totality of the method of FIG. 4. As another example, the machine executable code 606 may adapt the processors 602 to perform at least a portion or a totality of the operations discussed for the camera 130, the marker generator circuit 140, the screen 150, the computer vision circuit 160, and the network 170 of FIGS. 1-3 and 5.

The processors 602 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine executable code 606 (e.g., software code, firmware code, hardware descriptions) related to embodiments of the present disclosure. It is noted that a general-purpose processor (may also be referred to herein as a host processor or simply a host) may be a microprocessor, but in the alternative, the processors 602 may include any conventional processor, controller, microcontroller, or state machine. The processors 602 may also be implemented as a combination of computing devices, such as a combination of a DSP and a microprocessor, a plurality of microprocessors, one or more microprocessors in conjunction with a DSP core, or any other such configuration.

In some embodiments the storage 604 includes volatile data storage (e.g., random-access memory (RAM), non-volatile data storage (e.g., Flash memory, a hard disc drive, a solid state drive, erasable programmable read-only memory (EPROM), etc.). In some embodiments the processors 602 and the storage 604 may be implemented into a single device (e.g., a semiconductor device product, a system on chip (SOC), etc.). In some embodiments the processors 602 and the storage 604 may be implemented into separate devices.

In some embodiments the machine executable code 606 may include computer-readable instructions (e.g., software code, firmware code). By way of non-limiting example, the computer-readable instructions may be stored by the storage 60, accessed directly by the processors 602, and executed by the processors 602 using at least the logic circuitry 608. Also by way of non-limiting example, the computer-readable instructions may be stored on the storage 604, transferred to a memory device (not shown) for execution, and executed by the processors 602 using at least the logic circuitry 608. Accordingly, in some embodiments the logic circuitry 608 includes electrically configurable logic circuitry 608.

In some embodiments the machine executable code 606 may describe hardware (e.g. circuitry) to be implemented in the logic circuitry 608 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, VERILOG™, SYSTEMVERILOG™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 608 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine executable code 606 may include an HDL, an RTL, a GL description, a mask level description, other hardware description, or any combination thereof.

In embodiments where the machine executable code 606 includes a hardware description (at any level of abstraction), a system (not shown, but including the storage 604) may be configured to implement the hardware description described by the machine executable code 606. By way of non-limiting example, die processors 602 may include a programmable logic device (e.g., an FPGA or a PLC) and the logic circuitry 608 may be electrically controlled to implement circuitry corresponding to the hardware description into the logic circuitry 608. Also by way of non-limiting example, the logic circuitry 608 may include hard-wired logic manufactured by a manufacturing system (not shown, but including the storage 604) according to the hardware description of the machine executable code 606.

Regardless of whether the machine executable code 606 includes computer-readable instructions or a hardware description, the logic circuitry 608 is adapted to perform the functional elements described by the machine executable code 606 when implementing the functional elements of the machine executable code 606. It is noted that although a hardware description may not directly describe functional elements, a hardware description indirectly describes functional elements that the hardware elements described by the hardware description are capable of performing.

The computer vision circuit 160 may use image recognition or computer vision to identify objects in scene images. Artificial neural networks may identify objects in the scene image and put a boundary around each object. In particular, a location of an object in an image may be identified and a boundary may be drawn around the object. Pixel data within the boundary may be processed to classify and tag the object. Convolutional neural networks may comprise layers that perceive parts of an image. An image may be divided into small sections (feature maps) using filters or kernels. Convolution neural networks may advance through successive layers to recognize details or features of objects in the image.

Machine learning may also be employed to enhance image recognition or computer vision capability of the computer vision circuit 160. Machine vision artificial intelligence models may be provided images of pre-identified and classified objects, so the models may identify similar objects not previously seen by the image recognition machine. In particular, Pascal visual object classes (VOC) and ImageNet databases may be utilized to provide object images in scenes typically viewed by an operator of a vehicle. Pascal visual object classes (VOC) may provide standardized image data sets for object class recognition, as described in Everingham et al., "The PASCAL Visual Object Classes (VOC) Challenge," Int. J. Comput. Vis. (2010) 88: 303-338, the entire contents of which are hereby incorporated by reference for all purposes. For an automobile, objects typically viewed by an operator may include: other vehicles, roads, lane markers, traffic signs, animals, pot holes, pedestrians, debris, and construction equipment.

The computer vision circuit 160 may comprise artificial intelligence to identify an object in a scene or one or more groups of objects in a scene. The computer vision circuit 160 may determine a period for which historical data is to be maintained. It may enable downloading of available object identification intelligence, which can be utilized for root cause analysis or recordation of historical operating status to allow the artificial intelligence to more quickly and accurately identify objects. Processor(s) 602 can provide or can provide, at least in part, the described functionality of computer vision circuit 160 with artificial intelligence or components therein. Processor(s) 602 also can execute machine executable code 606 stored in data storage device 604 to implement or provide at least part of the described functionality of artificial intelligence. In addition, processor 160 can construct models based on information provided by the camera. 130 (see FIG. 3) related to scene 122. Models may be based at least in part on historical input data, which can be retained in data storage devices 604, and generated intelligence can be retained in data storage devices 604. In an aspect, generation of intelligence can include various operations on collected data such as generation of patterns (temporal or spatial) of identification characteristics of one or more objects, e.g., patterns of characteristic(s) in the scene can be identified and correlated with scene information, e.g., object identification characteristics.

Such artificial intelligence methodologies can be retained in machine executable code to identify objects in a scene. As an example, Hidden Markov Models (HMMs) and related prototypical dependency models may be employed. General probabilistic graphical models, such as Dempster-Shafer networks and Bayesian networks like those created by structure search using a Bayesian model score or approximation may also be utilized. In addition, linear classifiers, such as support vector machines (SVMs), non-linear classifiers like methods referred to as "neural network" methodologies, or fuzzy logic methodologies may also be employed. Moreover, game theoretic models (e.g., game trees, game matrices, pure and mixed strategies, utility algorithms, Nash equilibria, evolutionary game theory, or other model or combination of models) and other approaches that perform data fusion, may be exploited.

Although examples have been described above, other variations and examples may be made from this disclosure without departing from the spirit and scope of these disclosed examples.

The invention claimed is:

1. A system comprising:
a camera to capture a scene image of a scene having an object as viewed from a perspective of an operator through a windscreen;
a computer vision circuit to identify an object image corresponding to the object in the scene image captured by the camera;
a marker generator circuit to generate a marker indicative of the identified object image and to determine a marker position in the operator's line of sight between the object and the operator; and
a screen to display the generated marker in the marker position to appear associated with the identified object as viewed from the perspective of the operator through the windscreen.

2. The system of claim 1, wherein the camera is to be worn by the operator.

3. The system of claim 1, wherein the camera is to be mounted proximate the operator's line of sight.

4. The system of claim 1, wherein the marker comprises an outline of the object.

5. The system of claim 1, wherein the marker generator circuit is to position the marker so as to appear overlaid on the identified object from the perspective of the operator through the windscreen.

6. The system of claim 1, wherein the screen comprises an organic light-emitting diode screen.

7. The system of claim 1, comprising a projector to project the marker onto the screen.

8. The system of claim 1, comprising a communication network to communicate between at least two of the cameras, the computer vision circuit, and the marker generator circuit.

9. The system of claim 8, wherein the communication network comprises a wireless network.

10. A method comprising:
capturing a scene image of a scene having an object as viewed from a perspective of an operator through a windscreen;
identifying an object image corresponding to the object in the scene image;
generating a marker indicative of the identified object image and determining a marker position in the vehicle operator's line of sight between the object and the operator; and
displaying the generated marker in the marker position to appear associated with the identified object as viewed from the perspective of the operator through the windscreen.

11. The method of claim 10, comprising determining a distance between the object and a time-of-flight camera.

12. The method of claim 11, wherein the camera is to be worn by the operator.

13. The method of claim 11, wherein the camera to be mounted proximate the operator's line of sight.

14. The method of claim 10, wherein identifying the object image comprises recognizing the object with a computer vision circuit.

15. The method of claim 10, wherein displaying the generated marker comprises displaying an outline of the object so as to appear overlaid on the identified object from the perspective of the operator through the windscreen.

16. The method of claim 10, wherein displaying the generated marker comprises displaying the marker via an organic light-emitting diode screen to appear associated with an object when viewed through the windscreen.

17. The method of claim 10, wherein displaying the generated marker comprises projecting the marker onto the windscreen.

18. The method of claim 10, comprising communicating data corresponding to the scene image or marker between at least two of the cameras, a computer vision circuit, and a marker generator circuit.

19. The method of claim 18, wherein communicating comprises wirelessly communicating.

20. A system comprising:
a camera to capture a scene image of a scene having an object as viewed from a perspective of a vehicle operator through a vehicle windscreen;
a computer vision circuit to identify an object image corresponding to the object in a scene image captured by the camera;
a marker generator circuit to generate a marker indicative of the identified object image and to determine a marker position in the vehicle operator's line of sight between the object and the vehicle operator;
an organic light-emitting diode screen to display the generated marker in the marker position to appear associated with the identified object as viewed from the perspective of the vehicle operator through the vehicle windscreen; and
a communication network facilitating communications between at least two of the cameras, the computer vision circuit, the marker generator circuit, and the organic light-emitting diode screen.

* * * * *

UNITED STATES PATENT AND TRADEMARK OFFICE
CERTIFICATE OF CORRECTION

PATENT NO. : 11,971,548 B1
APPLICATION NO. : 18/227503
DATED : April 30, 2024
INVENTOR(S) : Cristina-Georgeta Radu et al.

It is certified that error appears in the above-identified patent and that said Letters Patent is hereby corrected as shown below:

In the Specification

Column 9,
Line 20, "…60, accessed directly by the processors 602, and executed by …" Change to --- "…604, accessed directly by the processors 602, and executed by …" ---

Column 9,
Line 63, "…example, die processors 602 may include a programmable …" Change to --- "…example, the processors 602 may include a programmable …" ---

Signed and Sealed this
Eighteenth Day of June, 2024

Katherine Kelly Vidal
*Director of the United States Patent and Trademark Office*